US011160704B2

(12) United States Patent
Stajic et al.

(10) Patent No.: US 11,160,704 B2
(45) Date of Patent: Nov. 2, 2021

(54) JOYSTICK CHAIR

(71) Applicant: Zoran Stajic, Belgrade (RS)

(72) Inventors: Zoran Stajic, Belgrade (RS); Vuk Pusic, Belgrade (RS); Rados Radenkovic, Belgrade (RS); Nenad Dunjic, Belgrade (RS)

(73) Assignee: VRMECO LLC, Galveston, TX (US)

( * ) Notice: Subject to any disclaimer, the term of this patent is extended or adjusted under 35 U.S.C. 154(b) by 0 days.

(21) Appl. No.: 16/962,215

(22) PCT Filed: Feb. 8, 2018

(86) PCT No.: PCT/RS2018/000001
§ 371 (c)(1),
(2) Date: Jul. 14, 2020

(87) PCT Pub. No.: WO2019/139495
PCT Pub. Date: Jul. 18, 2019

(65) Prior Publication Data
US 2020/0360204 A1 Nov. 19, 2020

(30) Foreign Application Priority Data
Jan. 15, 2018 (RS) .................. P-2018/0043

(51) Int. Cl.
*A47C 1/00* (2006.01)
*A61G 5/14* (2006.01)
(Continued)

(52) U.S. Cl.
CPC ............ *A61G 5/14* (2013.01); *A47C 3/30* (2013.01); *A47C 7/004* (2013.01); *A47C 7/62* (2013.01);
(Continued)

(58) Field of Classification Search
CPC .. A61G 5/14; A61G 2203/14; A61G 2203/42; A47C 3/30; A47C 7/004;
(Continued)

(56) References Cited

U.S. PATENT DOCUMENTS 1,478,567 A * 12/1923 Howard .................. A47C 3/18
248/415
2,620,863 A * 12/1952 Cooper .................. A61B 90/60
297/461 X
(Continued)

*Primary Examiner* — Rodney B White

(57) ABSTRACT

Joystick chair is an input device for interaction between the user and computer. It enables the movement of the user in games. The invention is used by placing feet on the platform (3) and sitting or leaning on the seat (23). Command for turning is achieved by rotating the seat (23), either to the left or to the right. Command for forward movement is issued by pulling the left or right controller (36, 41) with fingers, while the command for backward movement is issued by pushing the left or right controller (36, 41) away by palms. Control handles for lateral movement (49, 56) are separated from the forward-back controls that are located on the controllers (36, 41). Other commands are achieved with buttons on the left and right controller and they are accessible with thumbs. The software allows the modifications of all available actions of the invention.

6 Claims, 26 Drawing Sheets

(51) Int. Cl.
  *A47C 3/30* (2006.01)
  *A47C 7/00* (2006.01)
  *A47C 7/62* (2006.01)
  *A47C 13/00* (2006.01)
  *G05B 19/4155* (2006.01)

(52) U.S. Cl.
  CPC .......... *A47C 13/00* (2013.01); *G05B 19/4155* (2013.01); *A61G 2203/14* (2013.01); *A61G 2203/42* (2013.01); *G05B 2219/35438* (2013.01)

(58) Field of Classification Search
  CPC ...... A47C 7/62; A47C 13/00; G05B 19/4155; G05B 2219/35438
  See application file for complete search history.

(56) References Cited

U.S. PATENT DOCUMENTS

| | | | | |
|---|---|---|---|---|
| 3,477,673 A * | 11/1969 | Bereday | A47C 9/025 | 297/423.1 X |
| 3,511,533 A * | 5/1970 | Drabert | A47C 9/025 | 297/337 |
| 4,054,319 A * | 10/1977 | Fogg, Jr. | A61G 5/042 | 297/330 X |
| 4,632,410 A * | 12/1986 | Bainbridge | B25H 3/00 | 280/32.5 |
| 4,802,542 A * | 2/1989 | Houston | B60L 1/003 | 297/330 X |
| 4,803,945 A * | 2/1989 | Adams | B63B 29/04 | 297/344.21 X |
| 5,149,174 A * | 9/1992 | Charash | A47C 9/005 | 297/423.12 X |
| 5,199,763 A * | 4/1993 | Wilder | A47C 9/025 | 297/330 X |
| 5,335,888 A * | 8/1994 | Thomsen | A47B 21/0371 | 2/16 |
| 5,435,623 A * | 7/1995 | Kapec | A61G 5/14 | 297/339 |
| 5,536,070 A * | 7/1996 | Lemmen | A47C 7/541 | 297/411.37 |
| 5,630,648 A * | 5/1997 | Allard | A47C 9/025 | 297/327 |
| D387,745 S * | 12/1997 | Evans | D14/460 | |
| 5,701,968 A * | 12/1997 | Wright-Ott | A61H 3/008 | 180/65.1 |
| 5,807,177 A * | 9/1998 | Takemoto | G07F 17/32 | 463/47 |
| 6,053,519 A * | 4/2000 | Poindexter | A61G 5/042 | 180/907 |
| 6,783,179 B2 * | 8/2004 | Komura | A61G 5/14 | 297/330 |
| 6,824,149 B1 * | 11/2004 | Whitlock | B25H 5/00 | 280/32.6 |
| 7,020,913 B2 * | 4/2006 | Van Scheppingen | A61G 7/1017 | 24/648 |
| 7,111,856 B1 * | 9/2006 | Graham | A61H 3/04 | 135/67 |
| 7,273,255 B2 * | 9/2007 | Nylander | A61G 5/1059 | 297/330 |
| 7,293,825 B2 * | 11/2007 | Vergara | A47C 9/002 | 297/423.11 X |
| 7,614,639 B2 * | 11/2009 | Tholkes | A63B 21/008 | 280/638 |
| 7,726,729 B2 * | 6/2010 | Groll | A47C 9/025 | 297/4 |
| 8,220,872 B2 * | 7/2012 | Hong | A47C 3/30 | 297/312 |
| 8,894,487 B2 * | 11/2014 | Granger | G07F 17/3216 | 463/31 |
| 8,973,997 B2 * | 3/2015 | Green | A61G 5/1067 | 297/330 |
| 9,474,377 B2 * | 10/2016 | Keen | A47C 9/022 | |
| 9,968,195 B2 * | 5/2018 | Sheinkop | A47C 7/002 | |
| 10,376,071 B2 * | 8/2019 | Patton | F16C 11/04 | |
| 2005/0088029 A1 * | 4/2005 | Stokes | A47C 9/022 | 297/461 |
| 2006/0082202 A1 * | 4/2006 | Gasser | A47C 7/006 | 297/344.11 |
| 2006/0082203 A1 * | 4/2006 | Gasser | A47C 3/26 | 297/344.19 |
| 2006/0097557 A1 * | 5/2006 | Tholkes | A47C 9/002 | 297/330 |
| 2008/0211276 A1 * | 9/2008 | Rasmussen | A47C 7/72 | 297/217.3 |
| 2013/0069344 A1 * | 3/2013 | Moliner | A61G 5/042 | 280/650 |
| 2013/0319775 A1 * | 12/2013 | Ngoh | G01G 19/52 | 177/1 |
| 2017/0055713 A1 * | 3/2017 | Ravn | A61G 5/14 | |
| 2019/0099000 A1 * | 4/2019 | Waller | A47C 1/023 | |
| 2019/0125609 A1 * | 5/2019 | Mason | A47C 7/541 | |
| 2019/0255449 A1 * | 8/2019 | Hanna | B60K 1/04 | |
| 2019/0365585 A1 * | 12/2019 | Hacikadiroglu | A61H 3/008 | |
| 2020/0069059 A1 * | 3/2020 | Ortiz | A47C 7/50 | |
| 2020/0317049 A1 * | 10/2020 | Raja | B62D 1/12 | |
| 2021/0045953 A1 * | 2/2021 | Sanaei | A61G 5/124 | |

* cited by examiner

JOYSTICK CHAIR

BACKGROUND OF THE INVENTION

The invention belongs to the field of computer input devices, or widely observed, to the field of input devices or combined input and output devices for Interaction of user equipment and computer.

Major problems while using VR are as stated:
1) Safety of device users with focus on avoiding the possibility of injuries;
2) Occurrence of nausea in some users; and
3) Management of movement in Virtual Reality that gives a sense of real movement; comfort and reduction of fatigue in users.

Currently, as input devices for movement control and manipulation within the offered content in Virtual realty are following options:

Standard controller for playing—gamepad, where the command of motion is executed utilizing hand thumbs. With this solution, movement of the body and head are not synchronized, so it is possible to look at one side and move to the other. Our invention prevents this from happening by by forcing the user to make the turn with the whole body including the head movement to the same side. This effect is responsible for reducing nausea in VR Controllers used to precisely determine their position in space with similar flaw as a classic gamepad, cause nausea because of the way the commands for movement are given. With our device commands for movement are constructed in such a way that they are reducing or completely eliminating nausea while moving in Virtual Reality.

Systems for recognition of body position that have a flaw of complex setup and space limitation are more prone of causing injury or fatigue. Our device neutralizes possibility of injury or fatigue, and in the same time it's simple for setup and usage while occupying very limited space.

Systems for simulation of walking that use basic principle of waking in a place are very complicated and uncomfortable for usage. Additionally, they occupy large space and often lead to fatigue and/or injury, while not generating the true feeling for movement.

BRIEF SUMMARY OF INVENTION

The invention falls into a group of input devices for computer and/or gaming console. In addition it is a chair that enables comfortable and safely sitting or standing in leaning position.

Joystick chair has two basic positions of usage, leaning and sitting.

In a standing position the user is leaning on a seat with a pelvic belt and the back under angle in relation to the vertical plain. The user is leaning while standing with their feet on the ground platform that stands under right angle in relation to the standing axis. This enables comfortable and longer usage of the Joystick chair with Increased safety due to the stability of the support for the body of a user.

In a sitting position the user takes natural sitting position.

Transition from sitting to leaning position and vice versa is regulated by the user himself, without need for getting down the seat and taking down VR glasses.

With Joystick chair a new way is applied for users to give a command to turn around their own axis. Command for turning is given by moving the body, to the left or right side, which is enough to achieve an illusion of a 360 degrees turn in VR. The angle that user takes on a seat is processed in microcontroller and than used to determine the turn and the angular velocity. Additional convenience of this type of a command is that the user doesn't have to turn, 360 degrees allowing the cable of the device, used to connect VR head mounted display the computer, is constantly behind the user preventing damage to the equipment or injury of the user With "Joystick Chair" a totally new way is applied to generate the command to move back and/or forth. Moving the handle with fingers towards yourself the user makes a move forward while pushing away the ergonomic bulge on a handle with the palms, a move backwards.

With "Joystick Chair" a new way is applied for users to control the sideways and back and forth movements, and these are separated in a way that eliminates the possibility of giving accidental simultaneous commands. This capability also leads to reduction in nausea.

DETAILED DESCRIPTION OF THE INVENTION

Figure 1A:
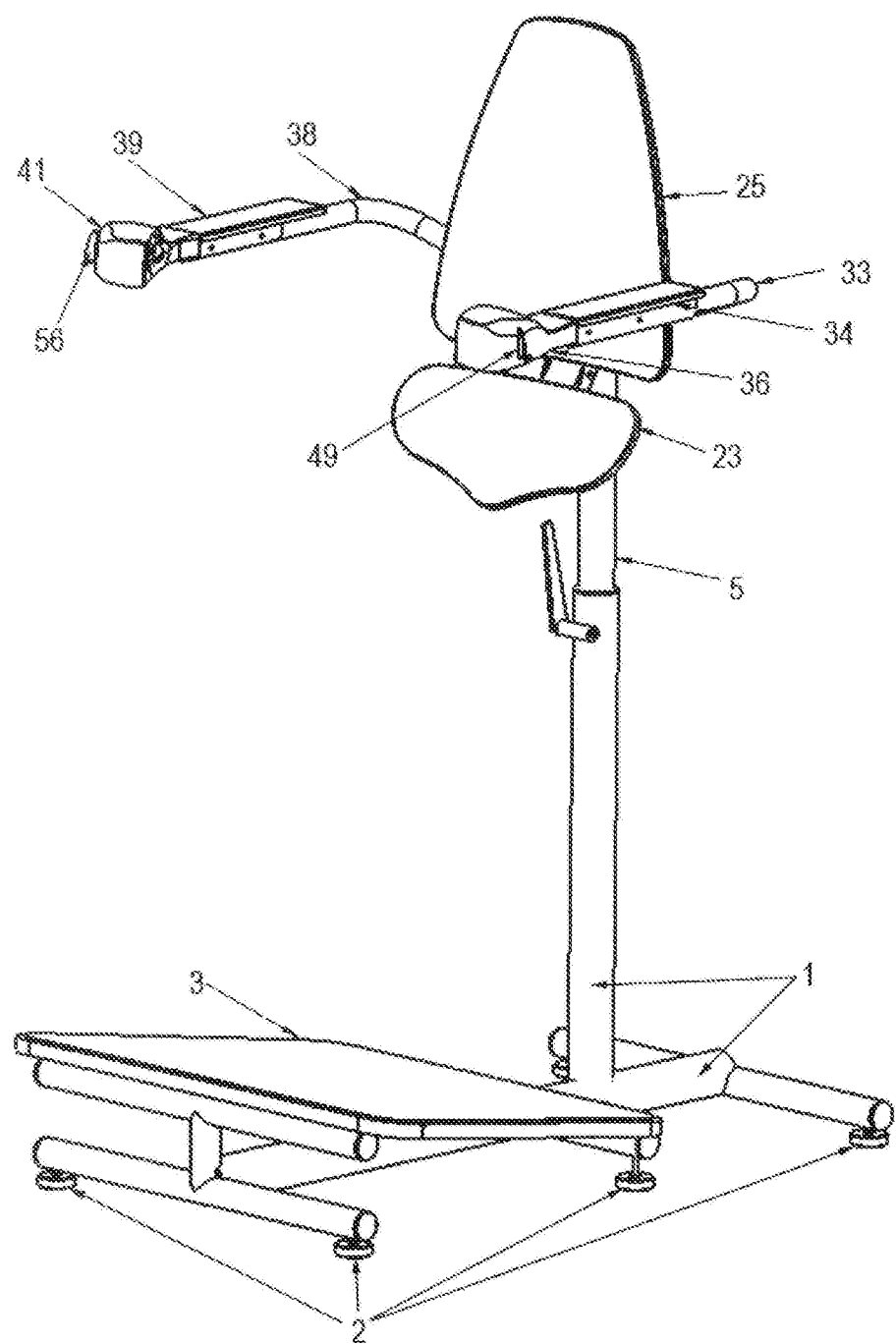
FIG. 1A is an assembled perspective view illustrating Joystick chair in accordance with one embodiment of the present invention viewed from an upper surface.
Figure 1B:
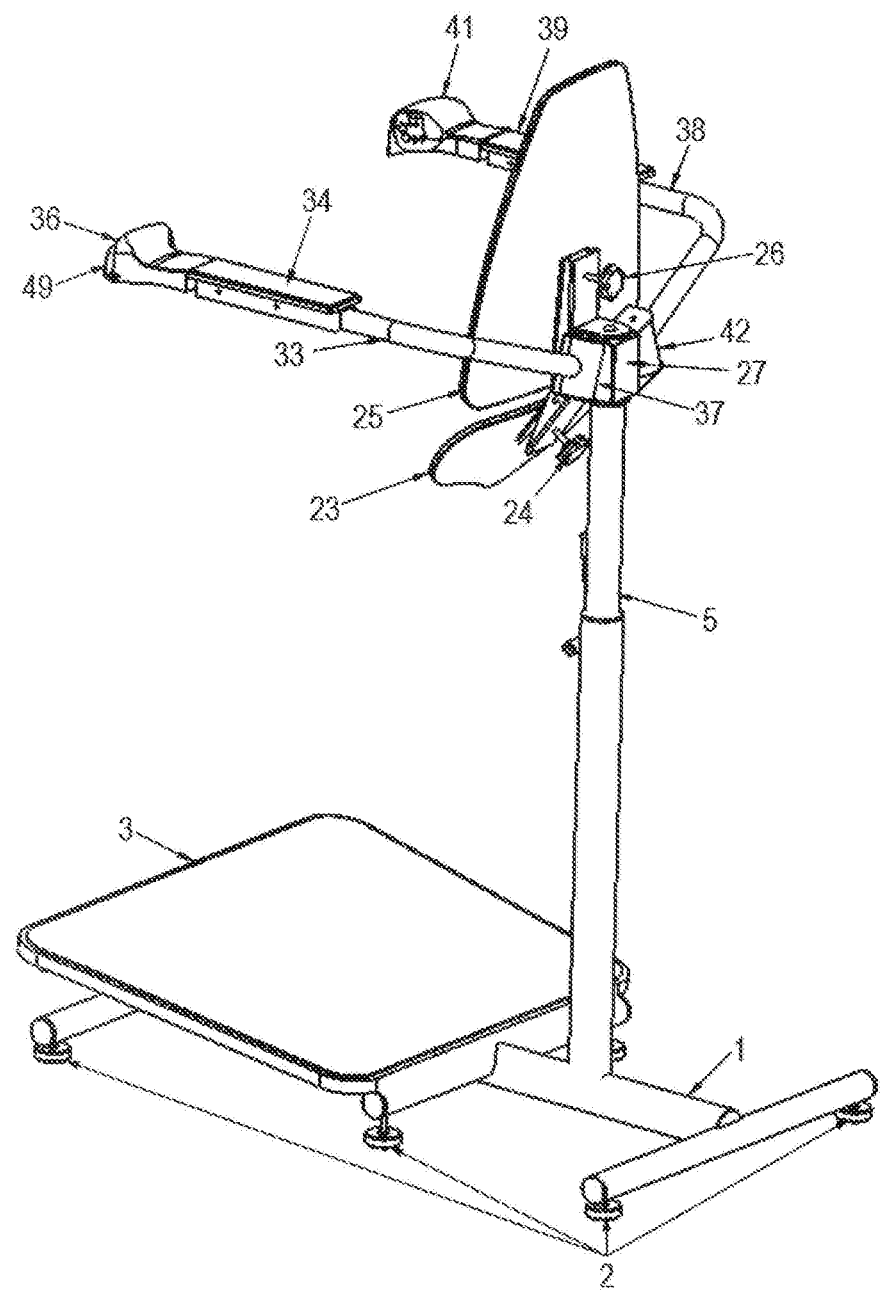
FIG. 1B is an assembled perspective view illustrating Joystick chair in accordance with one embodiment of the present invention viewed from an upper surface.
Figure 2:
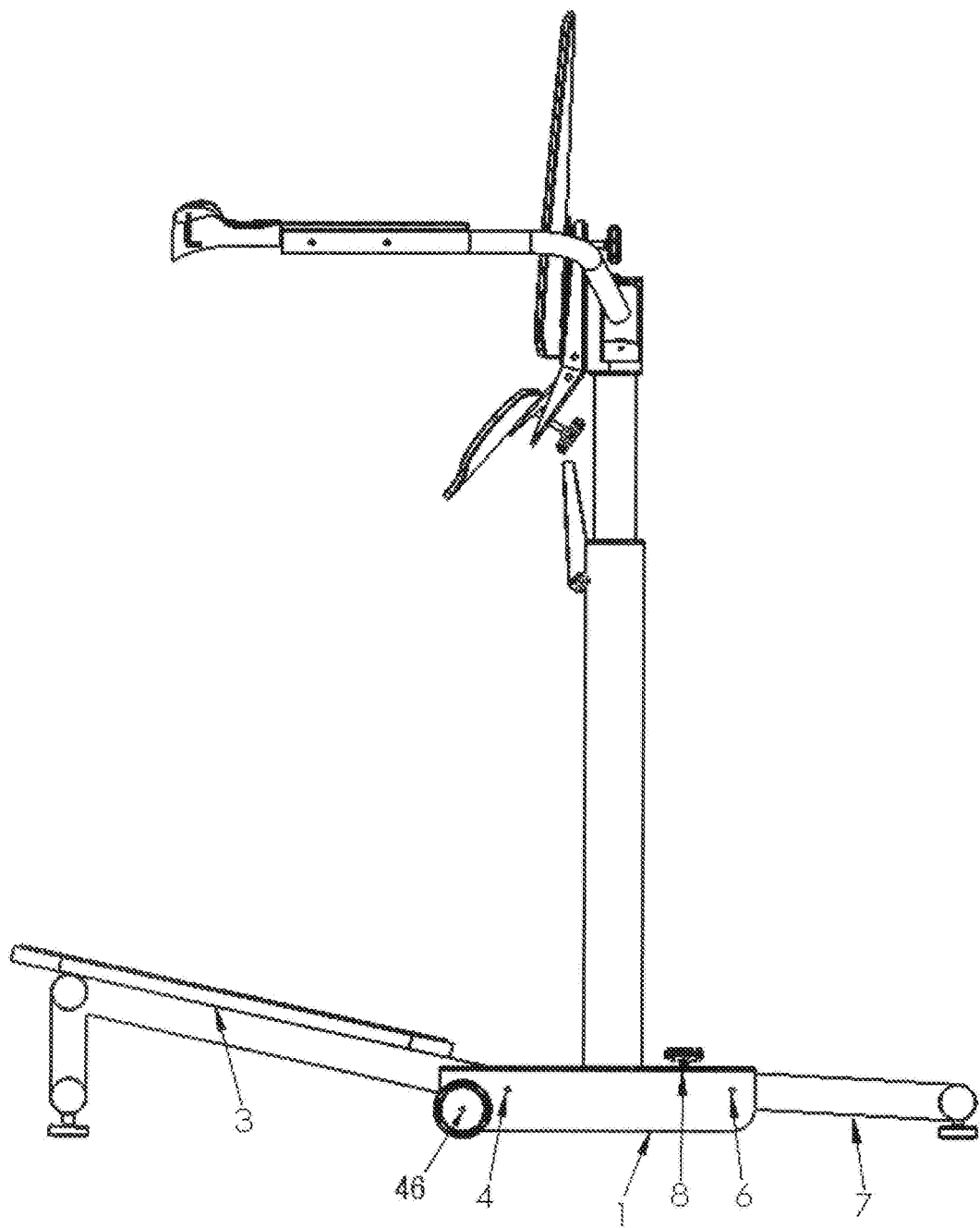
FIG. 2 is an assembled side view illustrating Joystick chair in accordance with one embodiment of the present invention.
Figure 3:
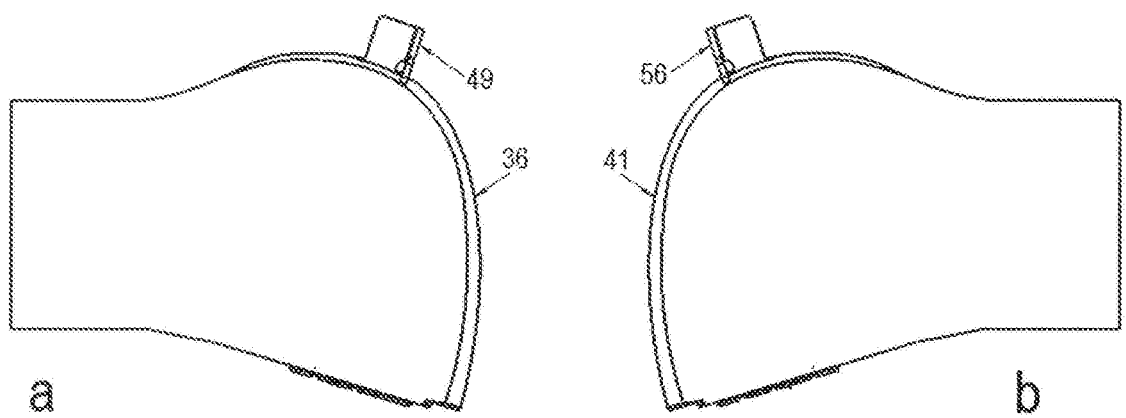
FIG. 3a is a top view illustrating a left controller of Joystick chair in accordance with one embodiment of the present invention.
FIG. 3b is a top view illustrating a right controller of Joystick chair in accordance with one embodiment of the present invention.
Figure 4:
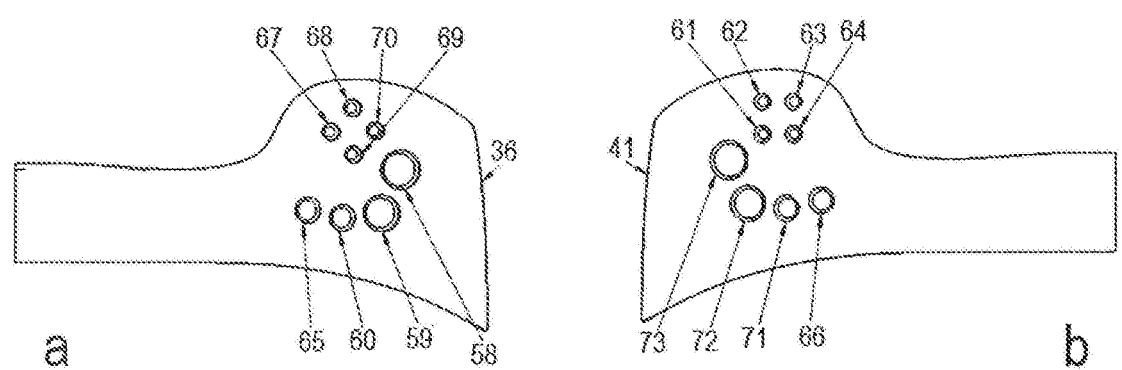
FIG. 4a is a side view illustrating a left controller of Joystick chair in accordance with one embodiment of the present invention.
FIG. 4b is a side view illustrating a right controller of Joystick chair in accordance with one embodiment of the present invention.
Figure 5:
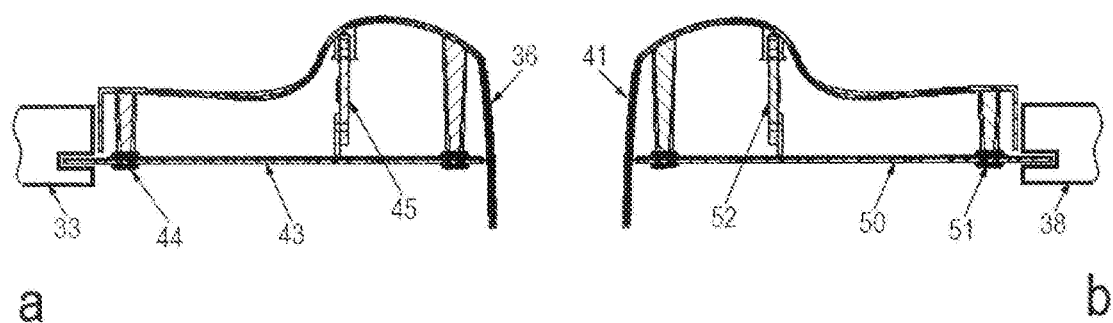
FIG. 5a is a side sectional view illustrating a left controller of Joystick chair in accordance with one embodiment of the present invention.
FIG. 5b is a side sectional view illustrating a right controller of Joystick chair in accordance with one embodiment of the present invention.
Figure 6:
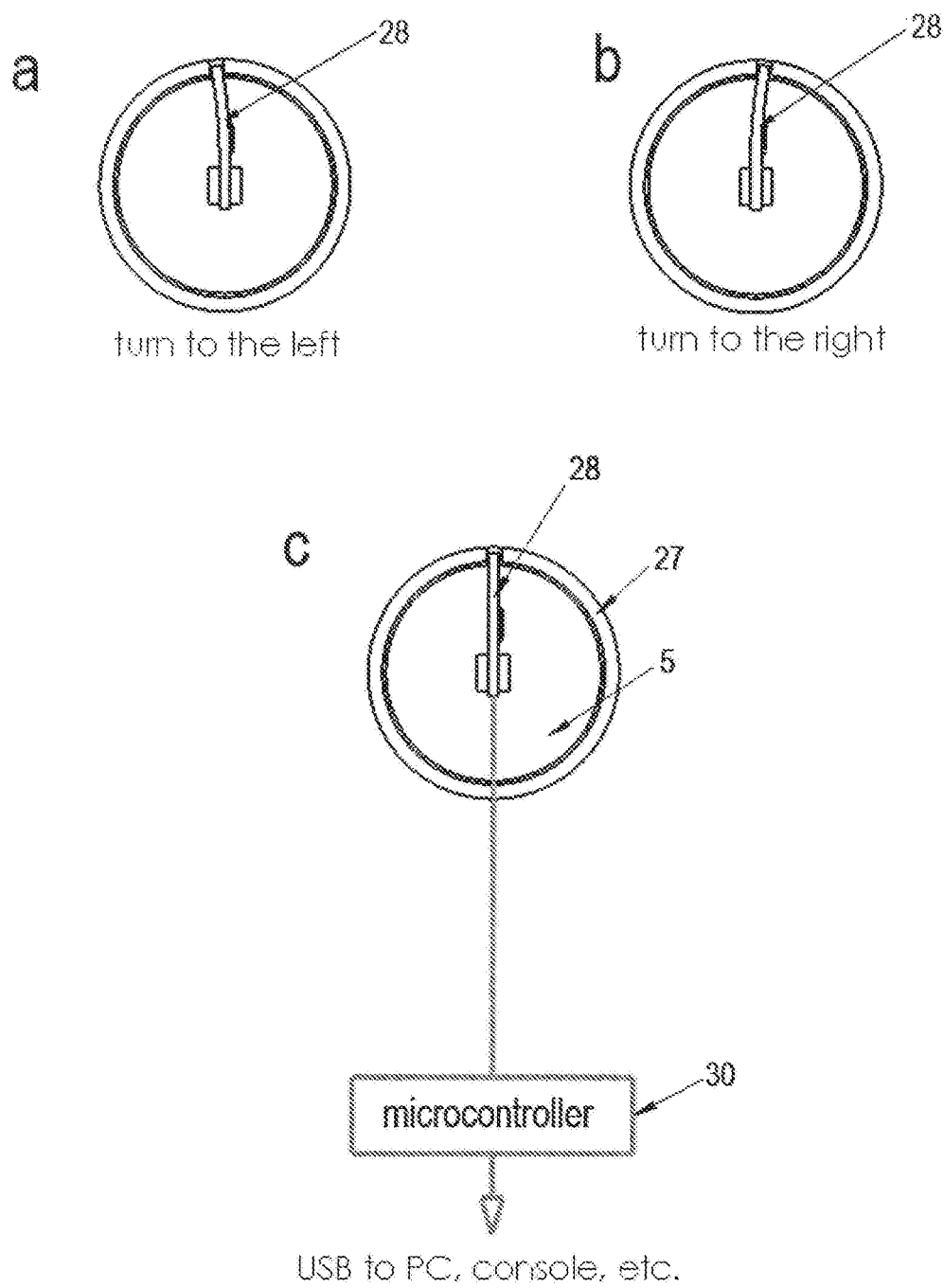
FIG. 6a is a diagram illustrating the principle of detection means for left turn command of Joystick chair in accordance with one embodiment of the present invention.
FIG. 6b is a diagram illustrating the principle of detection means for right turn command of Joystick chair in accordance with one embodiment of the present invention.
FIG. 6c is a diagram illustrating the principle of connection between rotation sensor and microcontroller for Joystick chair in accordance with one embodiment of the present invention.
Figure 7:
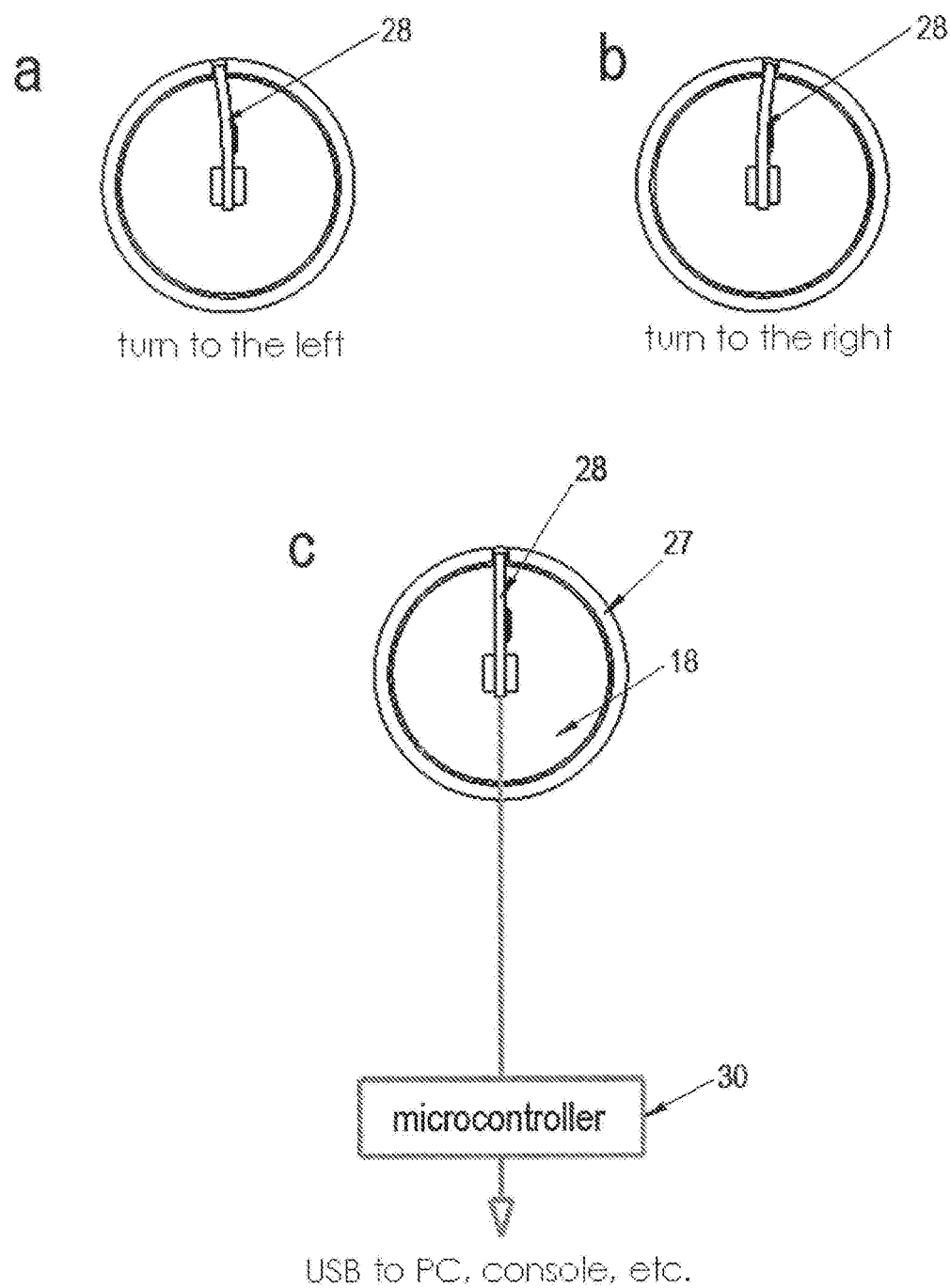
FIG. 7a is a diagram illustrating the principle of detection means for left turn command of Joystick chair in accordance with one embodiment of the present invention.
FIG. 7b is a diagram illustrating the principle of detection means for right turn command of Joystick chair in accordance with one embodiment of the present invention.
FIG. 7c is a diagram illustrating the principle of connection between rotation sensor and microcontroller on Joystick chair in accordance with one embodiment of the present invention.
Figure 8:
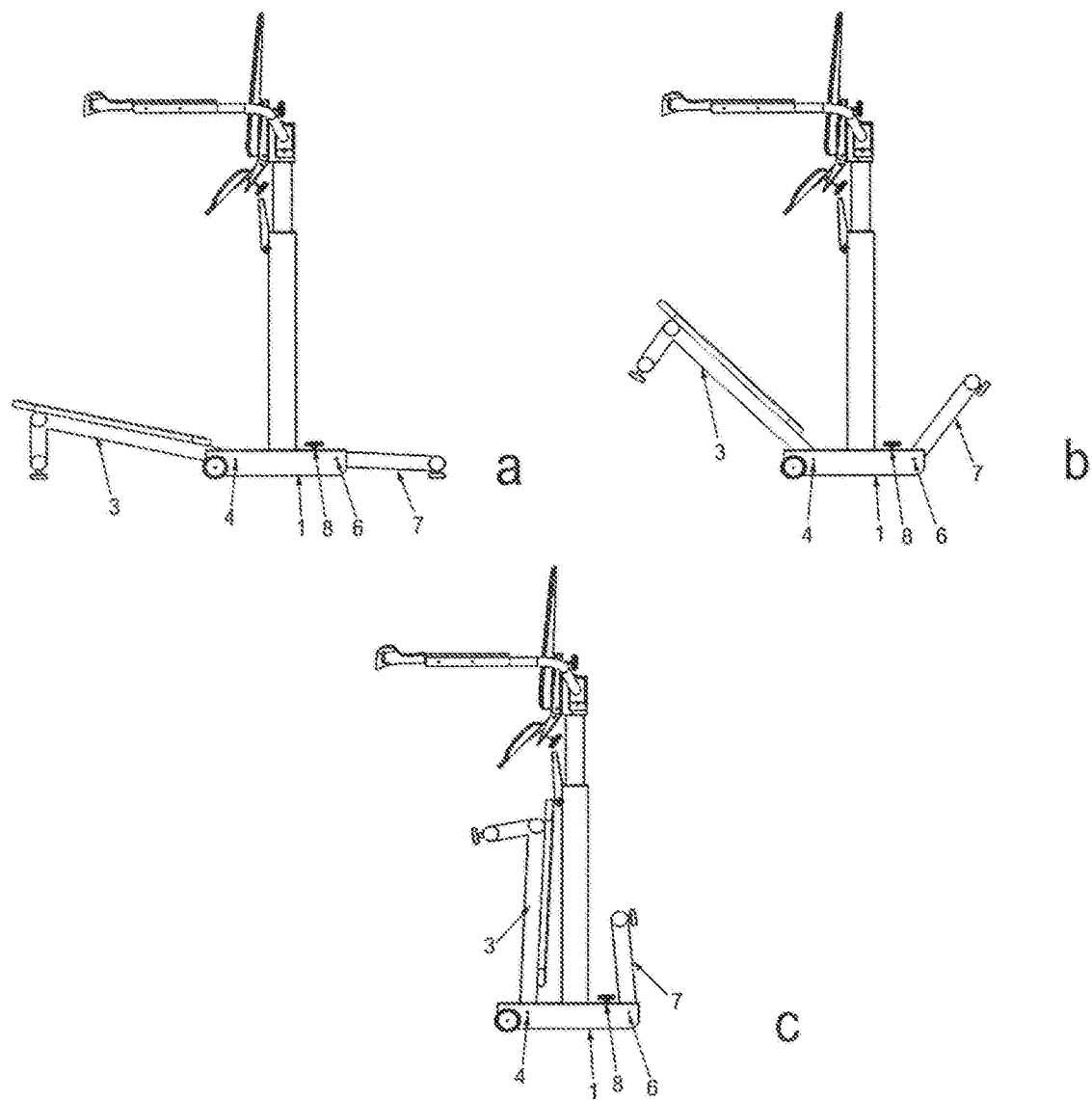
FIG. 8a is an assembled side view illustrating a unfolded position of platform and rear support for baseframe on Joystick chair in accordance with one embodiment of the present invention.
FIG. 8b is an assembled side view illustrating a semi folded position of platform and rear support for baseframe on Joystick chair in accordance with one embodiment of the present invention.
FIG. 8c is an assembled side view Illustrating a folded position of platform and rear support for baseframe on Joystick chair in accordance with one embodiment of the present invention.
Figure 9:
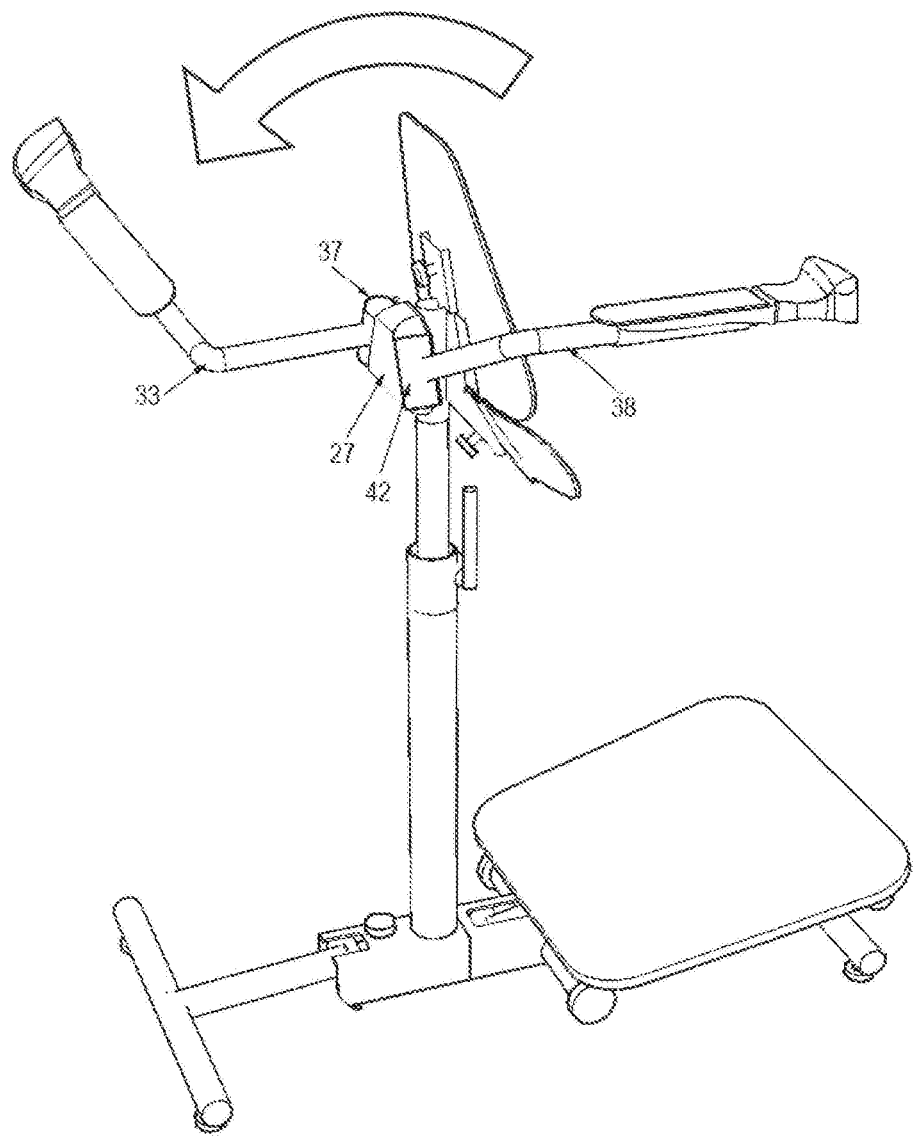
FIG. 9 is an assembled perspective view Illustrating a rear position of left armrest on Joystick chair in accordance with one embodiment of the present invention.
Figure 10:
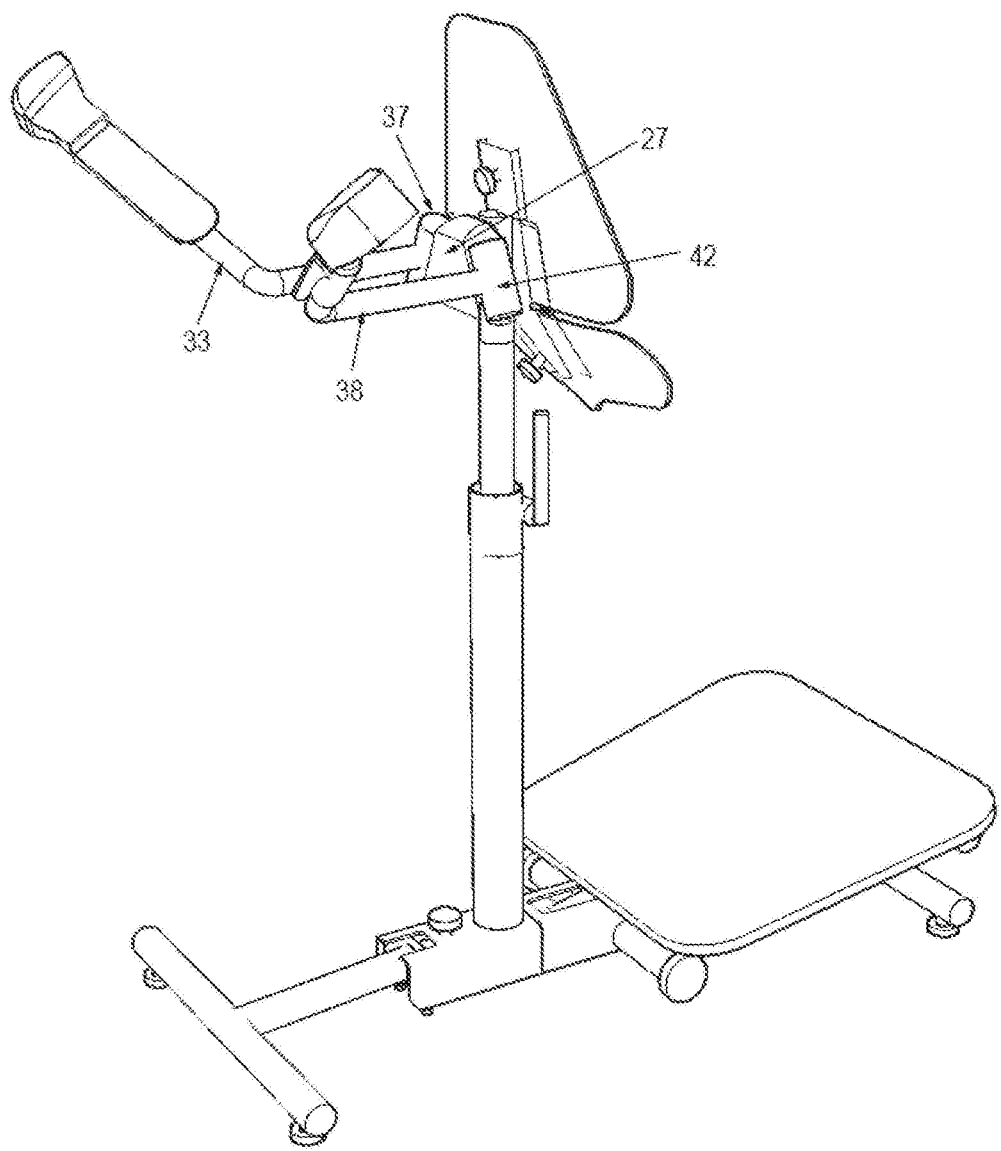
FIG. 10 is an assembled perspective view illustrating a rear position of left and right armrests on Joystick chair in accordance with one embodiment of the present invention.
Figure 11:
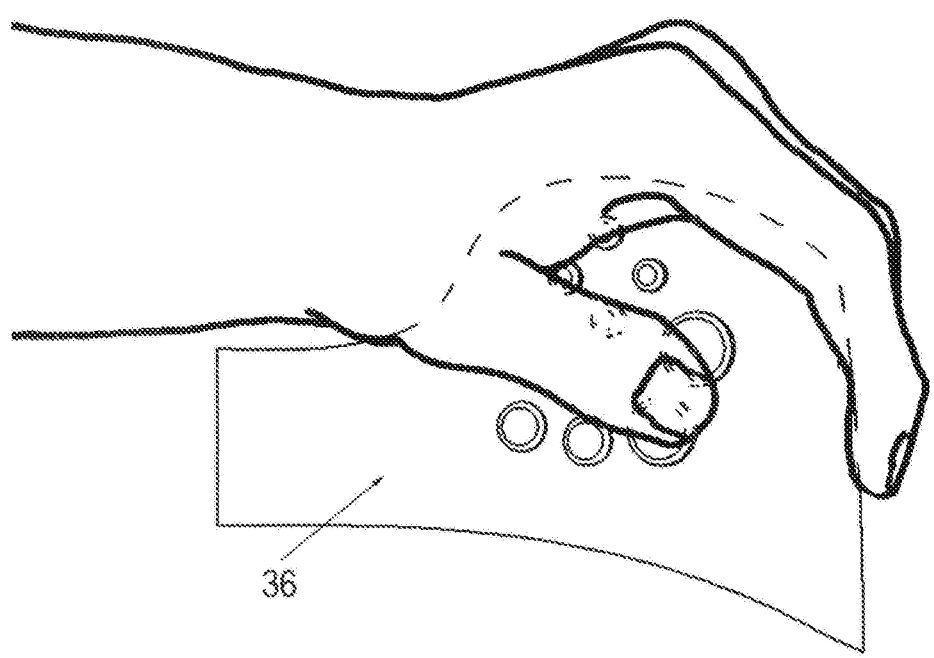
FIG. 11 is a diagram illustrating the principle of holding controller of Joystick chair in accordance with one embodiment of the present invention.
Figure 12:
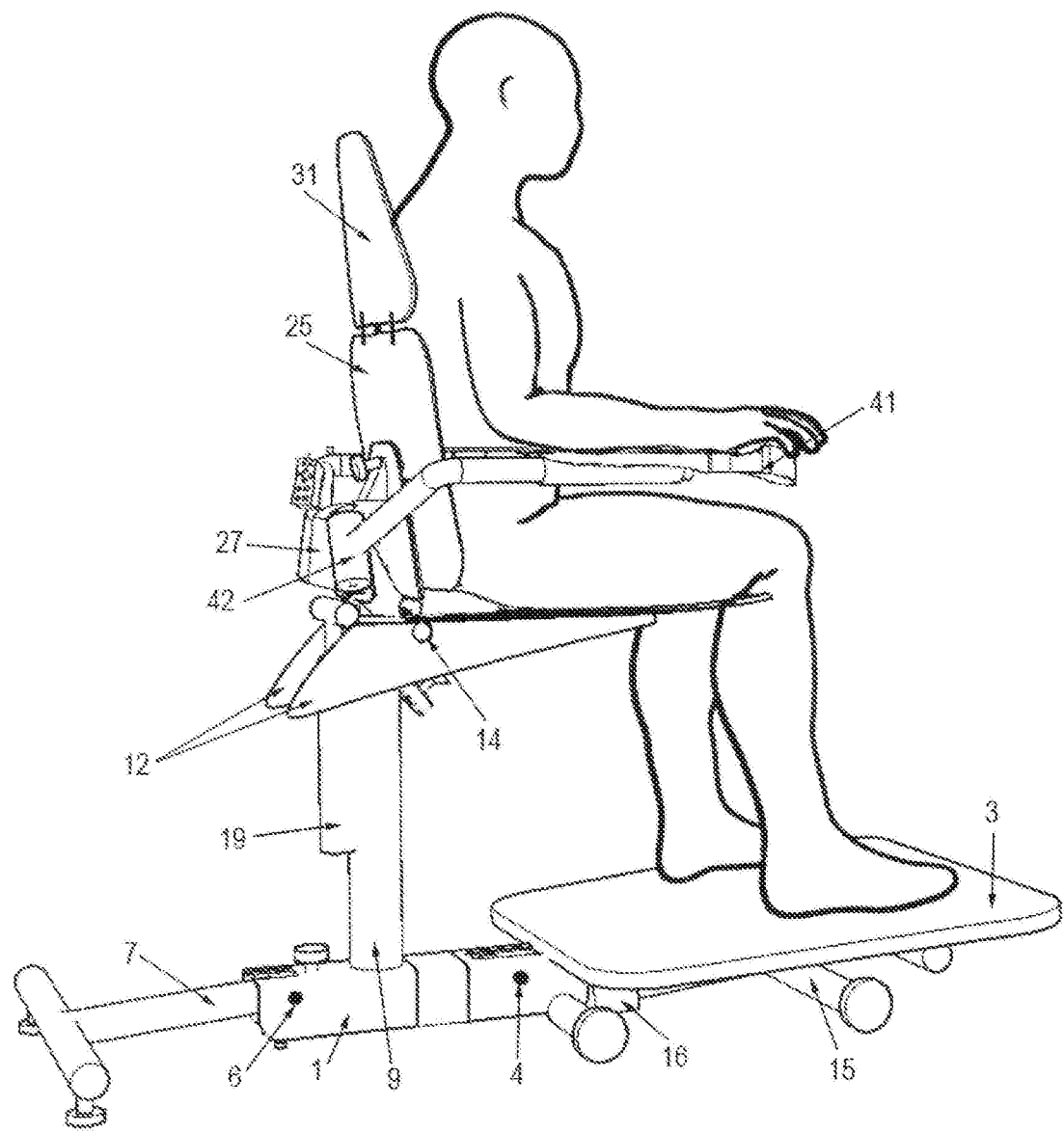
FIG. 12 is an assembled perspective view illustrating a seated posture for the Joystick chair in accordance with one embodiment of the present invention.
Figure 13:
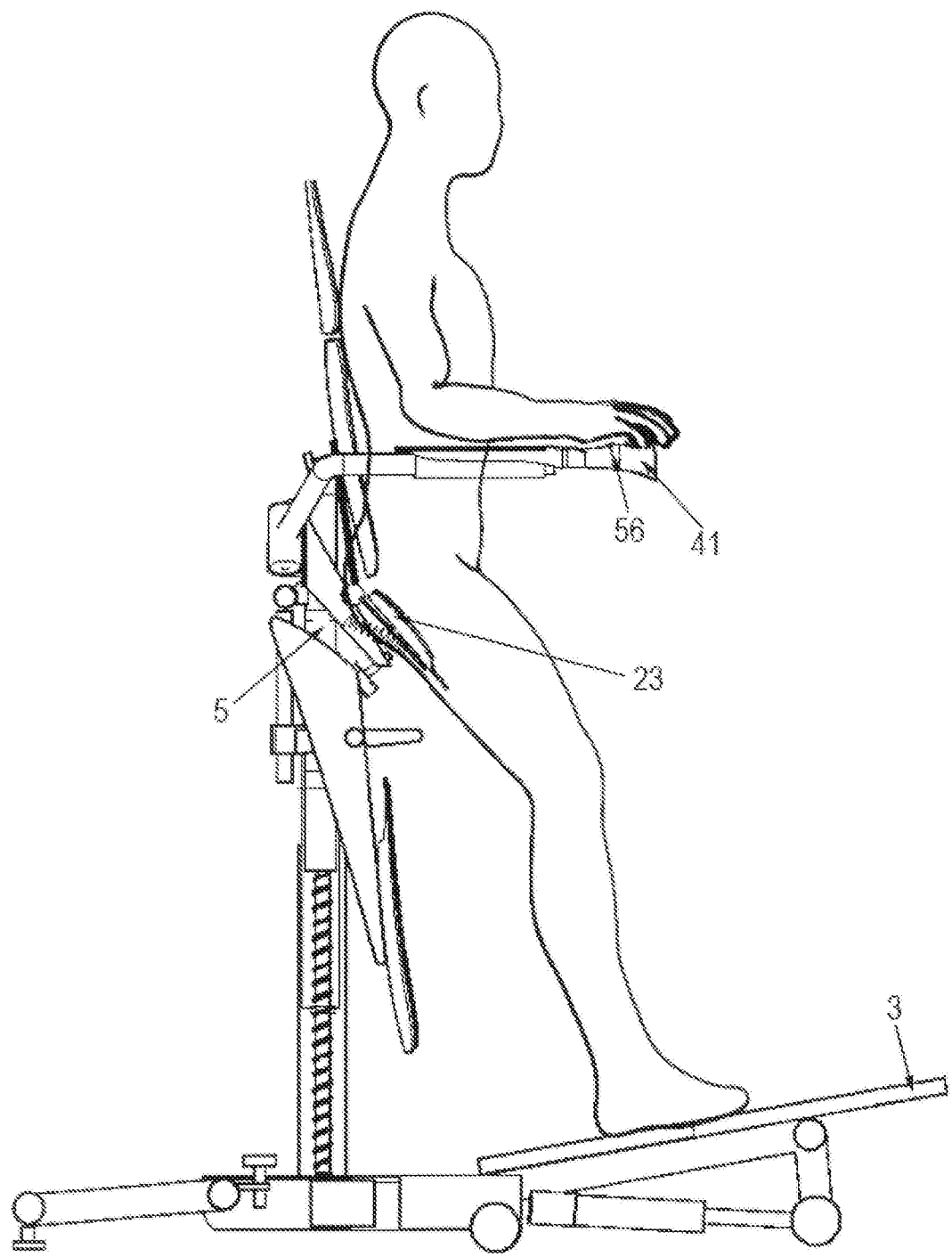
FIG. 13 is a assembled side sectional view illustrating a standing posture on the Joystick chair in accordance with one embodiment of the present invention.
Figure 14:
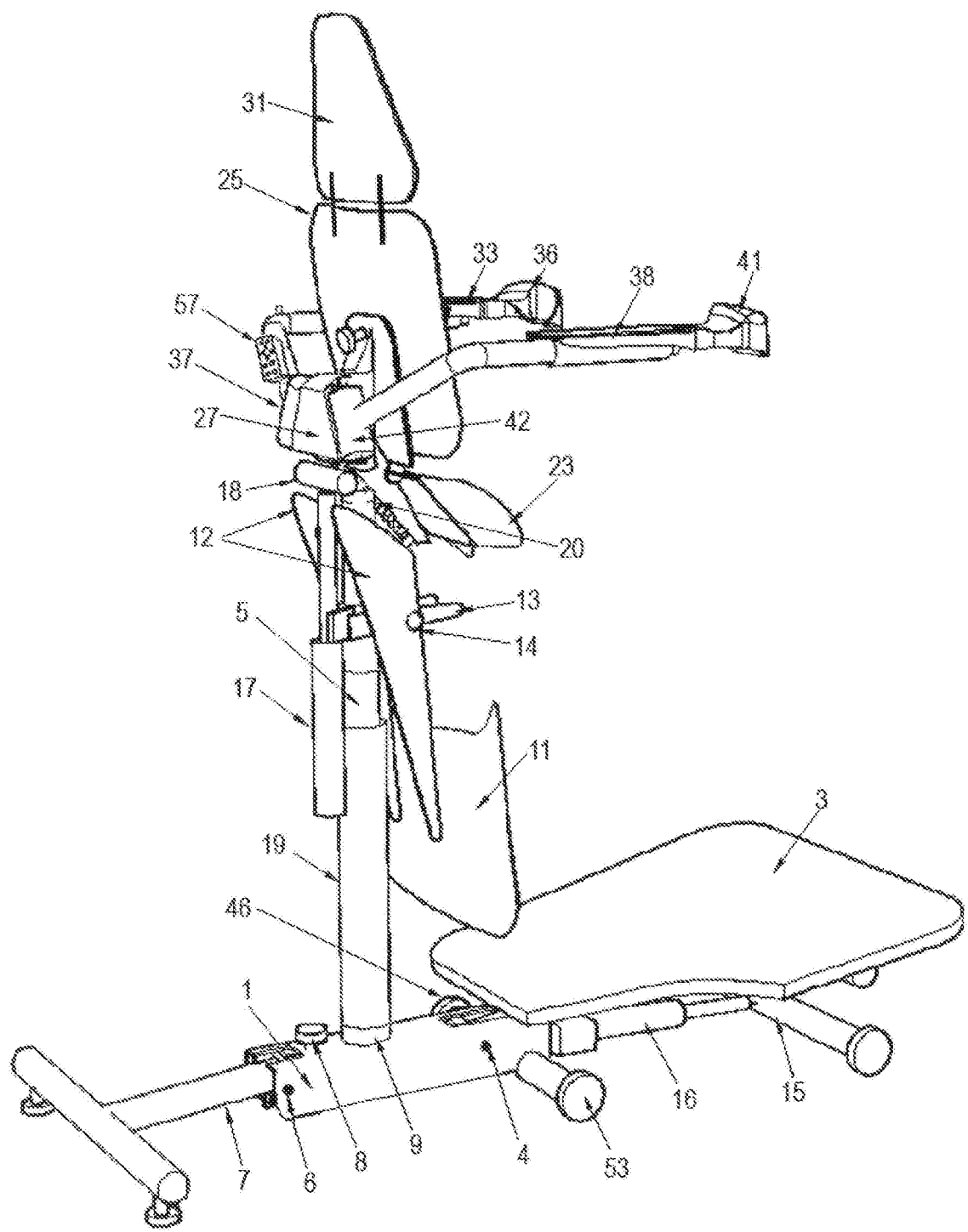
FIG. 14 is an assembled perspective sectional view illustrating a Joystick chair in accordance with one embodiment of the present invention.
Figure 15:
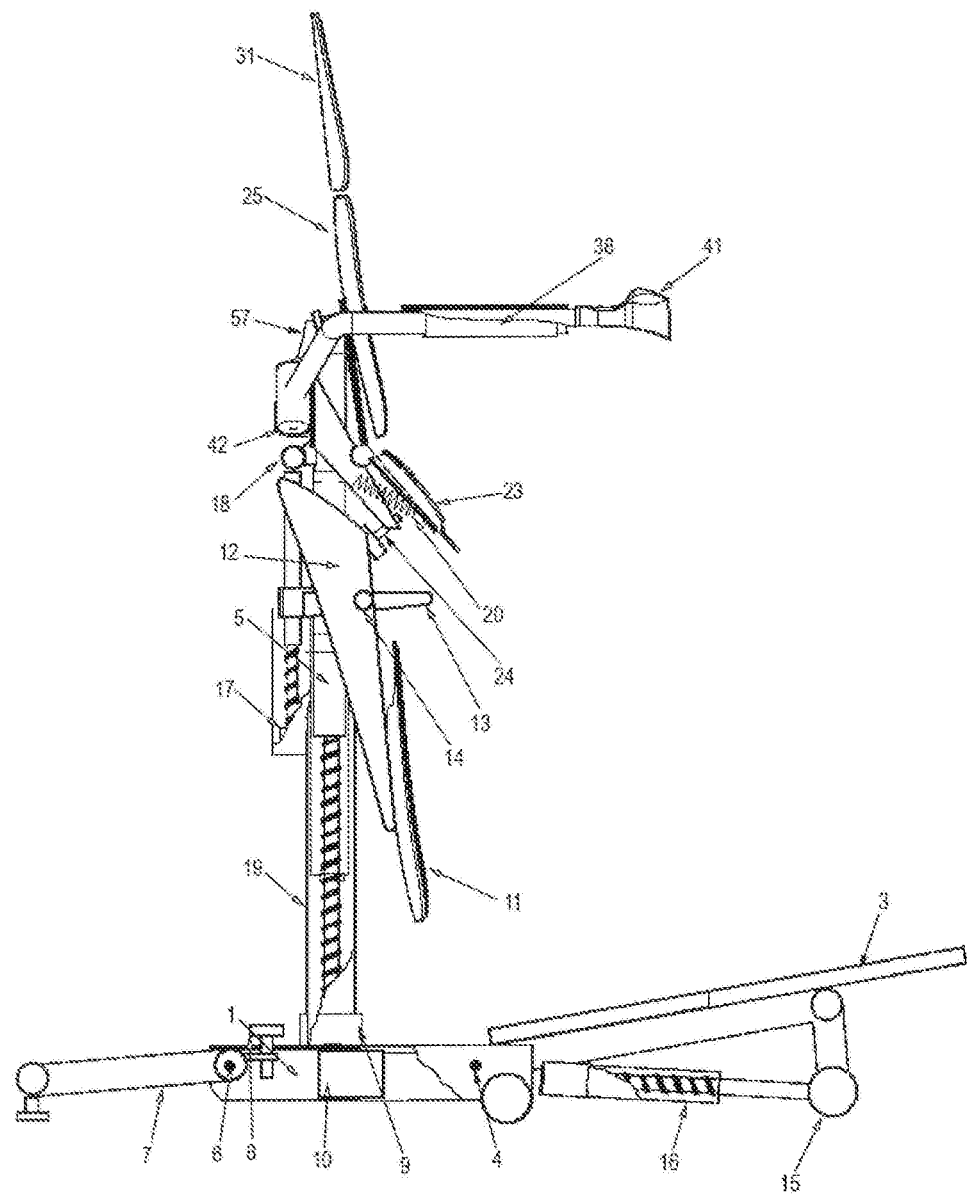
FIG. 15 is an assembled side sectional view illustrating a Joystick chair in accordance with one embodiment of the present invention.
Figure 16:
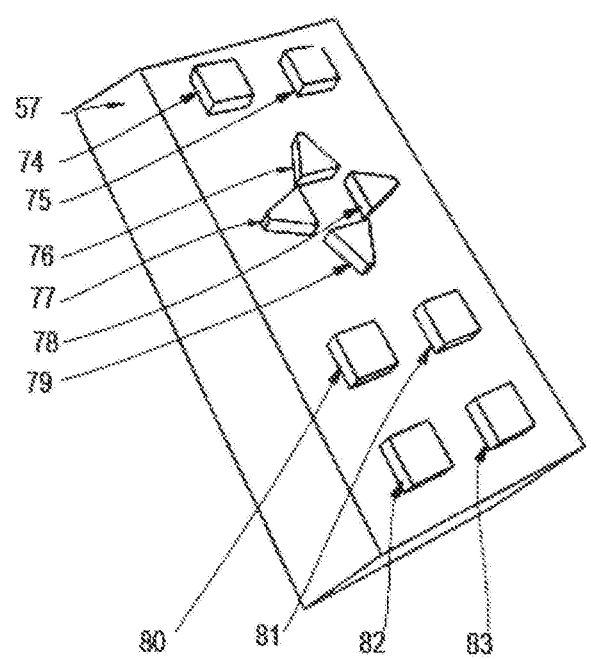
FIG. 16 is a perspective view illustrating a position controller for Joystick chair in accordance with one embodiment of the present invention.
Figure 17:
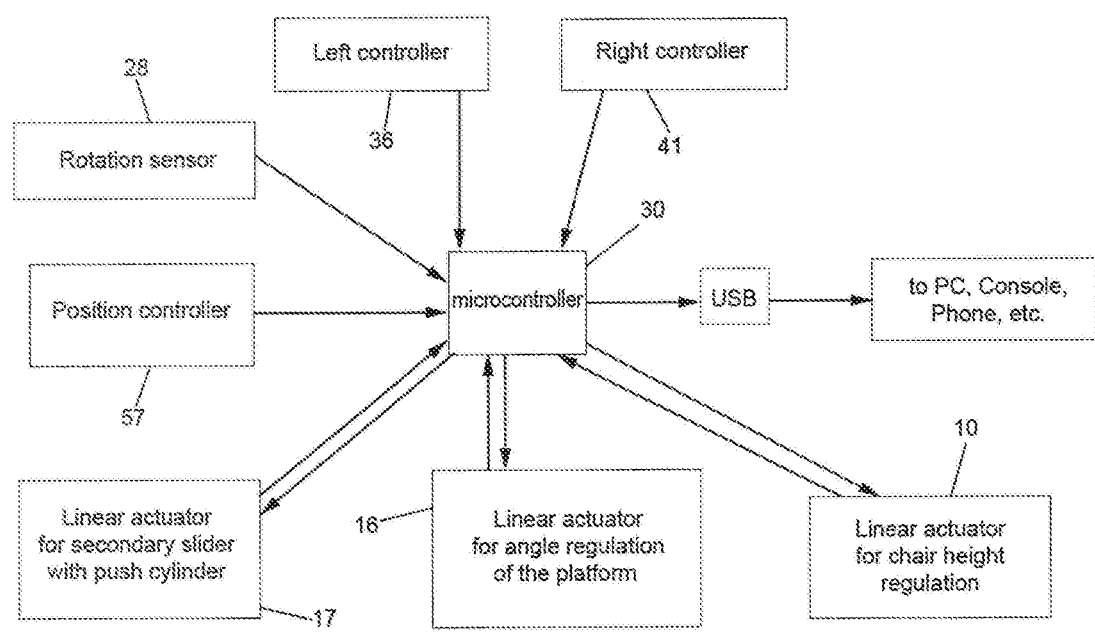
FIG. 17 is a diagram illustrating the principle of connection with microcontroller of Joystick chair in accordance with one embodiment of the present invention.
Figure 18:
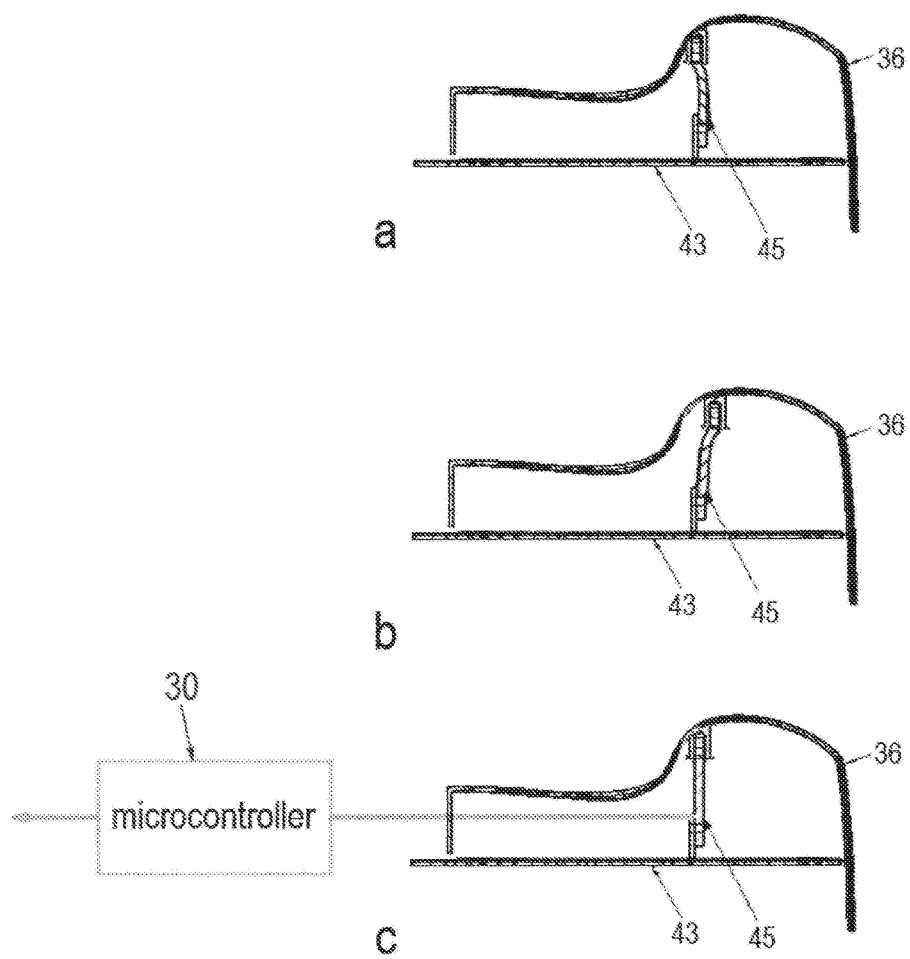
FIG. 18a is a diagram illustrating the principle of detection means for forward command on left controller of Joystick chair in accordance with one embodiment of the present invention.
FIG. 18b is a diagram illustrating the principle of detection means for backward command on left controller of Joystick chair in accordance with one embodiment of the present invention.
FIG. 18c is a diagram illustrating the principle of connection between left controller sensor and microcontroller on Joystick chair in accordance with one embodiment of the present invention.
Figure 19:
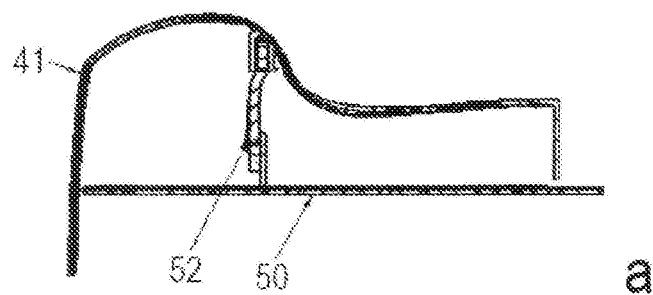
FIG. 19a is a diagram illustrating the principle of detection means for forward command on right controller of Joystick chair in accordance with one embodiment of the present invention.
FIG. 19b is a diagram illustrating the principle of detection means for backward command on right controller of Joystick chair in accordance with one embodiment of the present invention.
FIG. 19c is a diagram illustrating the principle of connection between right controller sensor and microcontroller on Joystick chair in accordance with one embodiment of the present invention.
Figure 19:
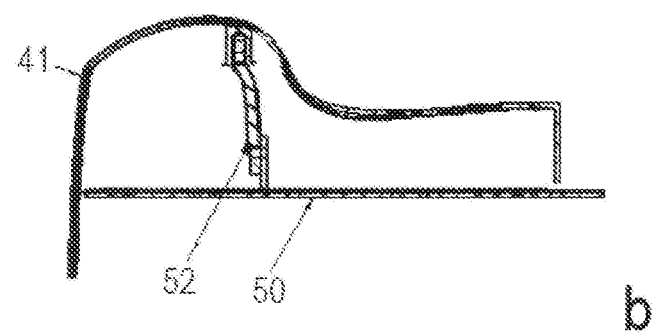
Figure 19:
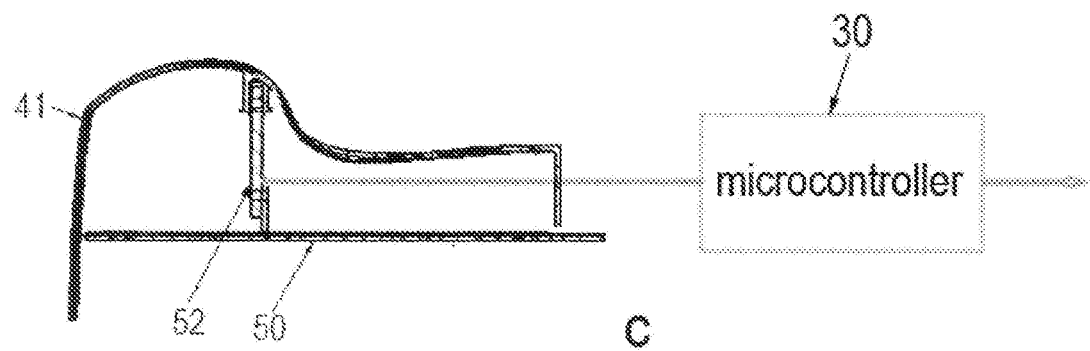
Figure 20:
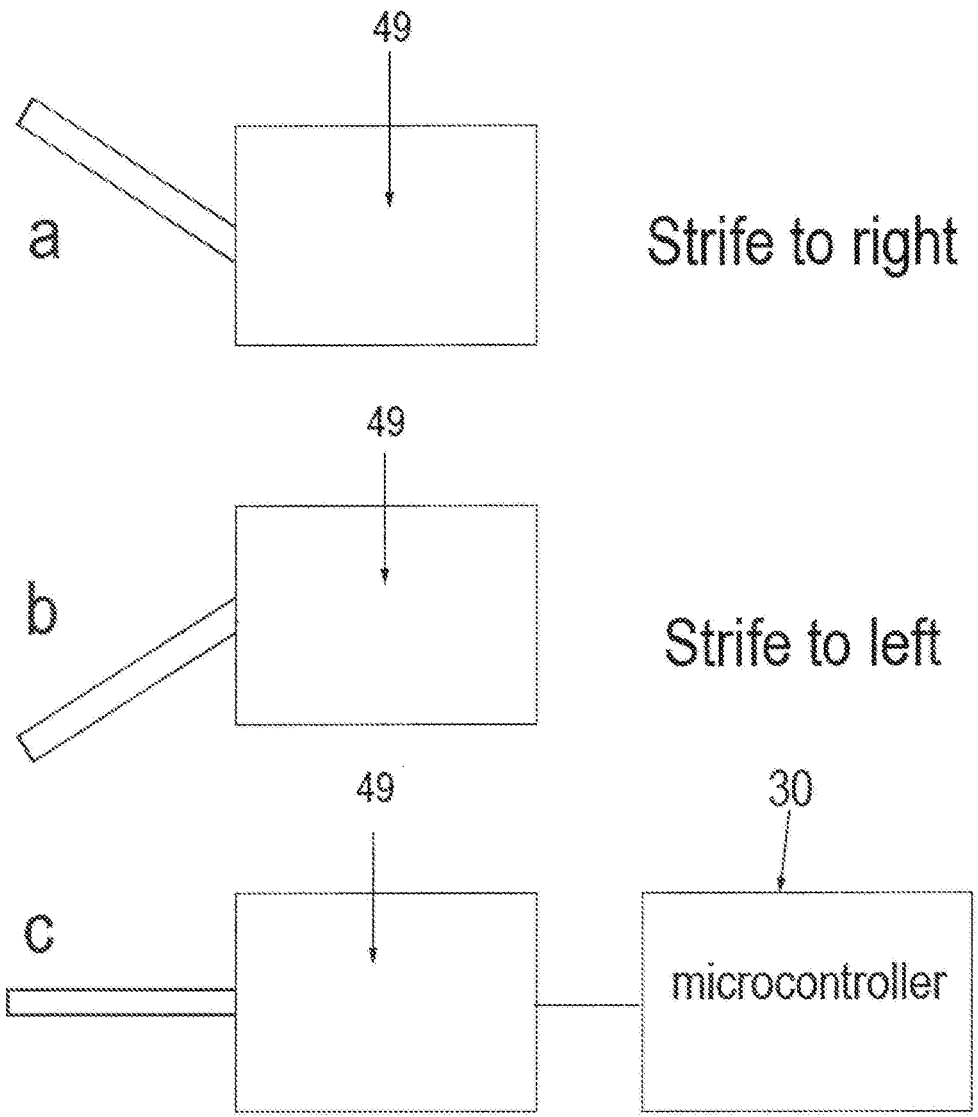
FIG. 20a is a diagram illustrating the principle of detection means for right strife command on left strife control of Joystick chair in accordance with one embodiment of the present invention.
FIG. 20b is a diagram illustrating the principle of detection means for left strife command on left strife control of Joystick chair in accordance with one embodiment of the present invention.
FIG. 20c is a diagram illustrating the principle of connection between left strife control and microcontroller on Joystick chair in accordance with one embodiment of the present invention.
Figure 21:
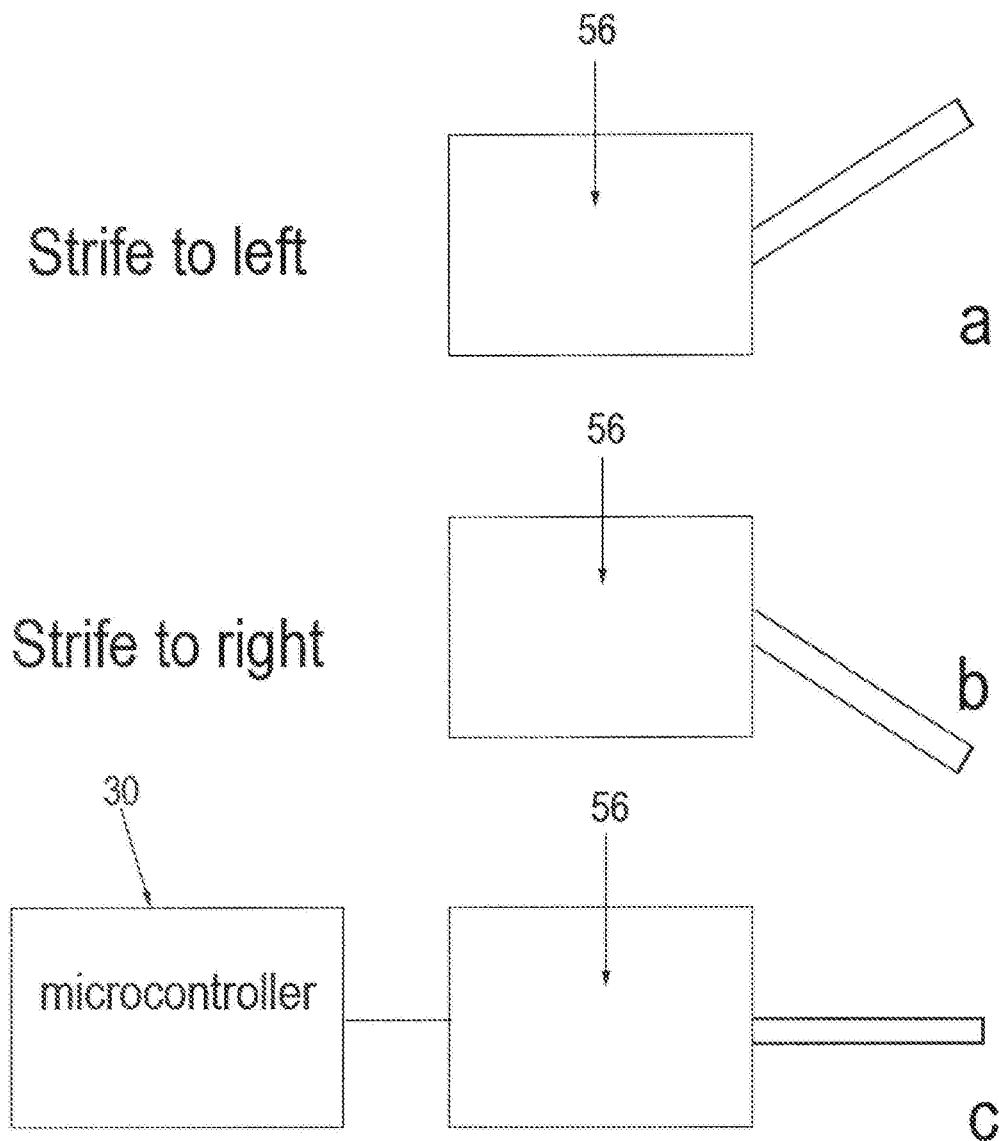
FIG. 21a is a diagram illustrating the principle of detection means for right strife command on right strife control of Joystick chair in accordance with one embodiment of the present invention.
FIG. 21b is a diagram illustrating the principle of detection means for left strife command on right strife control of Joystick chair in accordance with one embodiment of the present invention.
FIG. 21c is a diagram illustrating the principle of connection between right strife control and microcontroller on Joystick chair in accordance with one embodiment of the present invention.
Figure 22:
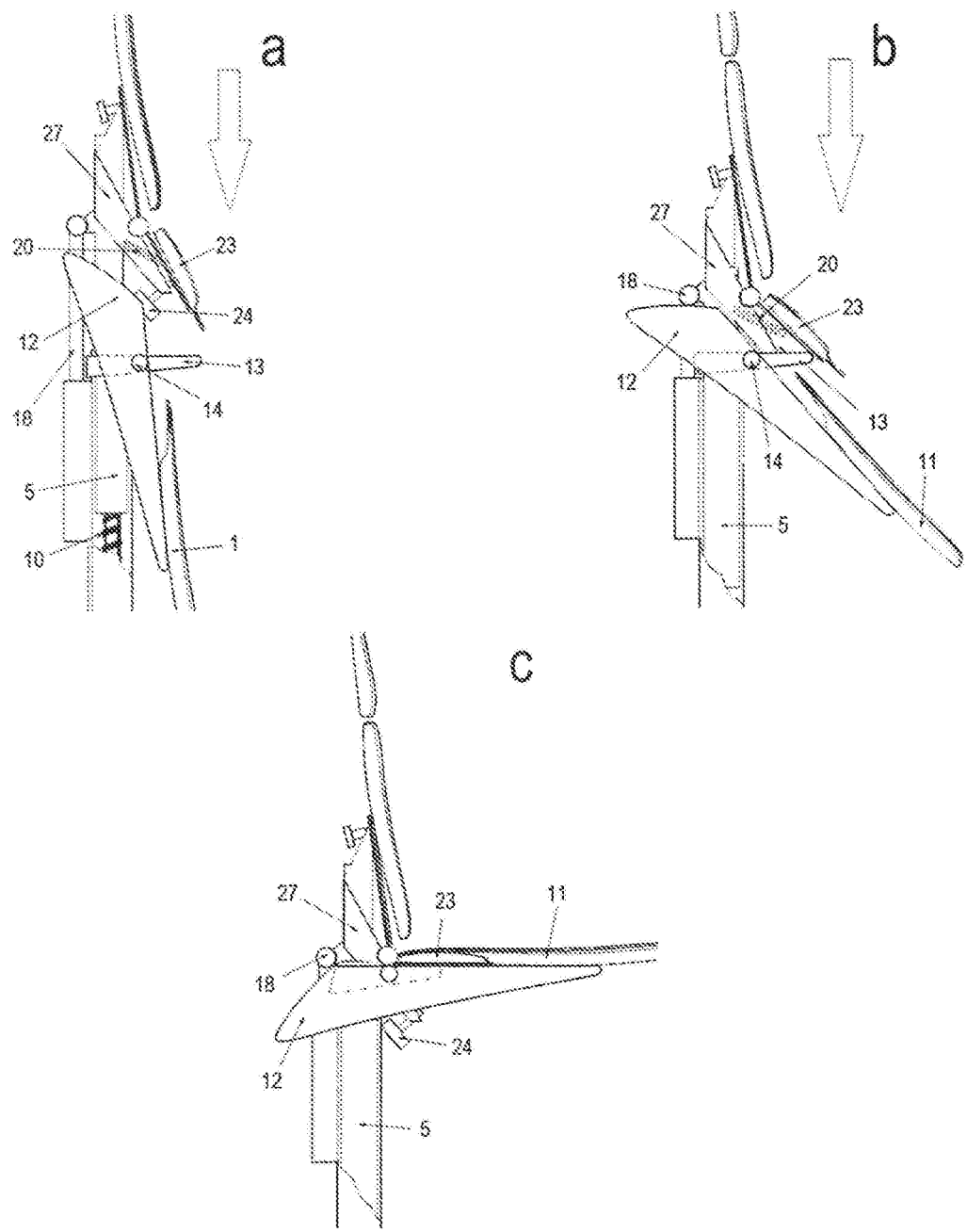
FIG. 22a is a diagram illustrating the principle of sitting mechanism in standing position on Joystick chair in accordance with one embodiment of the present invention.
FIG. 22b is a diagram illustrating the principle of sitting mechanism during the lowering on Joystick chair in accordance with one embodiment of the present invention.
FIG. 22c is a diagram illustrating the principle of sitting mechanism in seated position on Joystick chair in accordance with one embodiment of the present invention.
Figure 23:
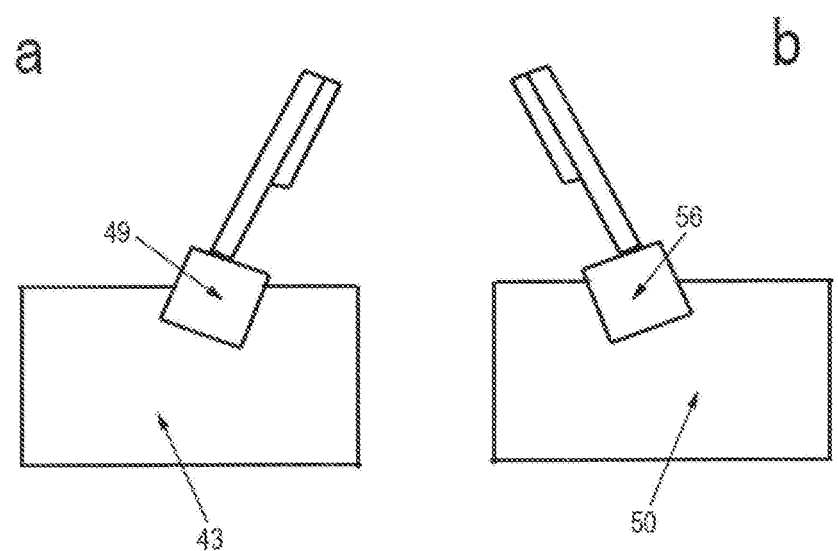
FIG. 23a is a top view illustrating a left strife control on Joystick chair in accordance with one embodiment of the present invention.
FIG. 23b is a top view illustrating a right strife control on Joystick chair in accordance with one embodiment of the present invention.
Figure 24A:
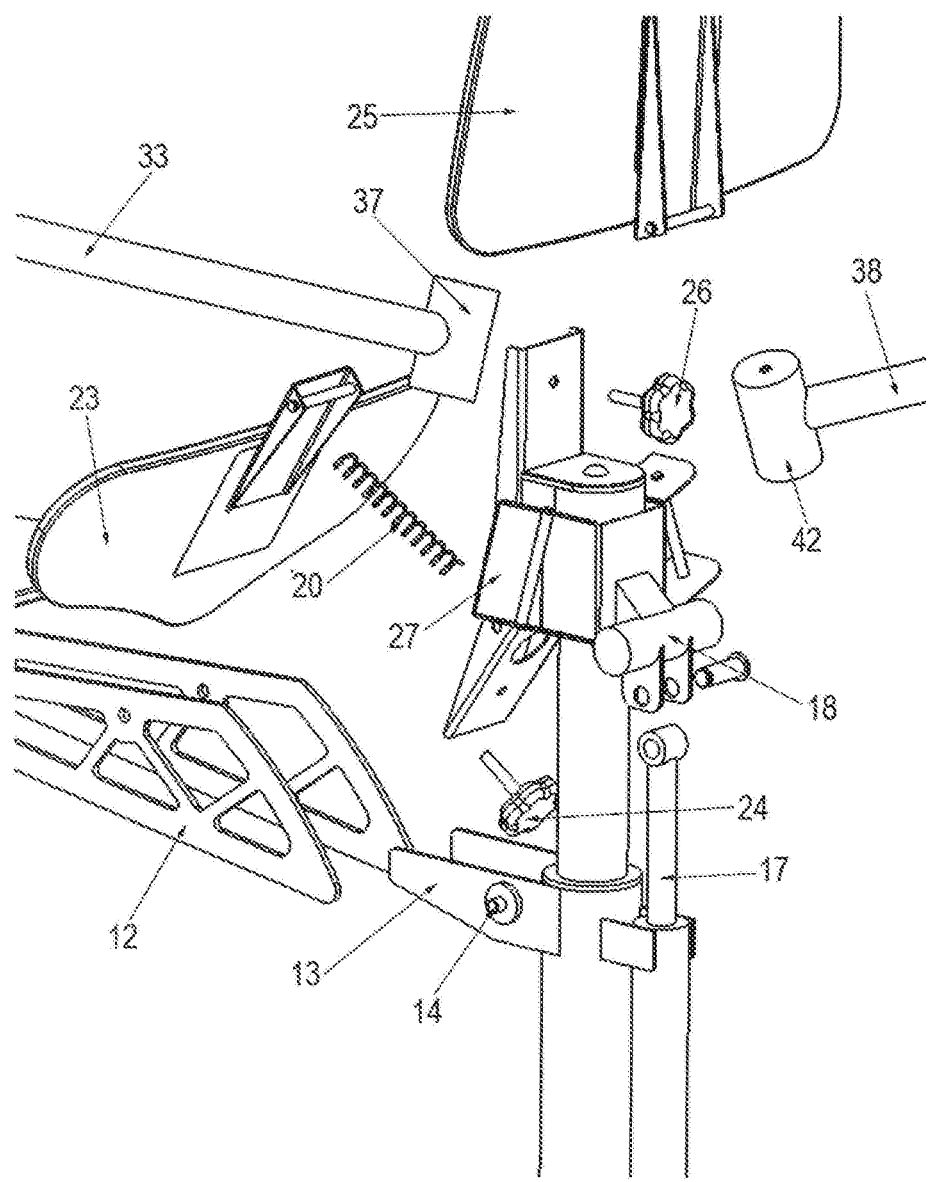
FIG. 24A is an exploded perspective back view illustrating an sitting mechanism on Joystick chair in accordance with one embodiment of the present invention.
Figure 24B:
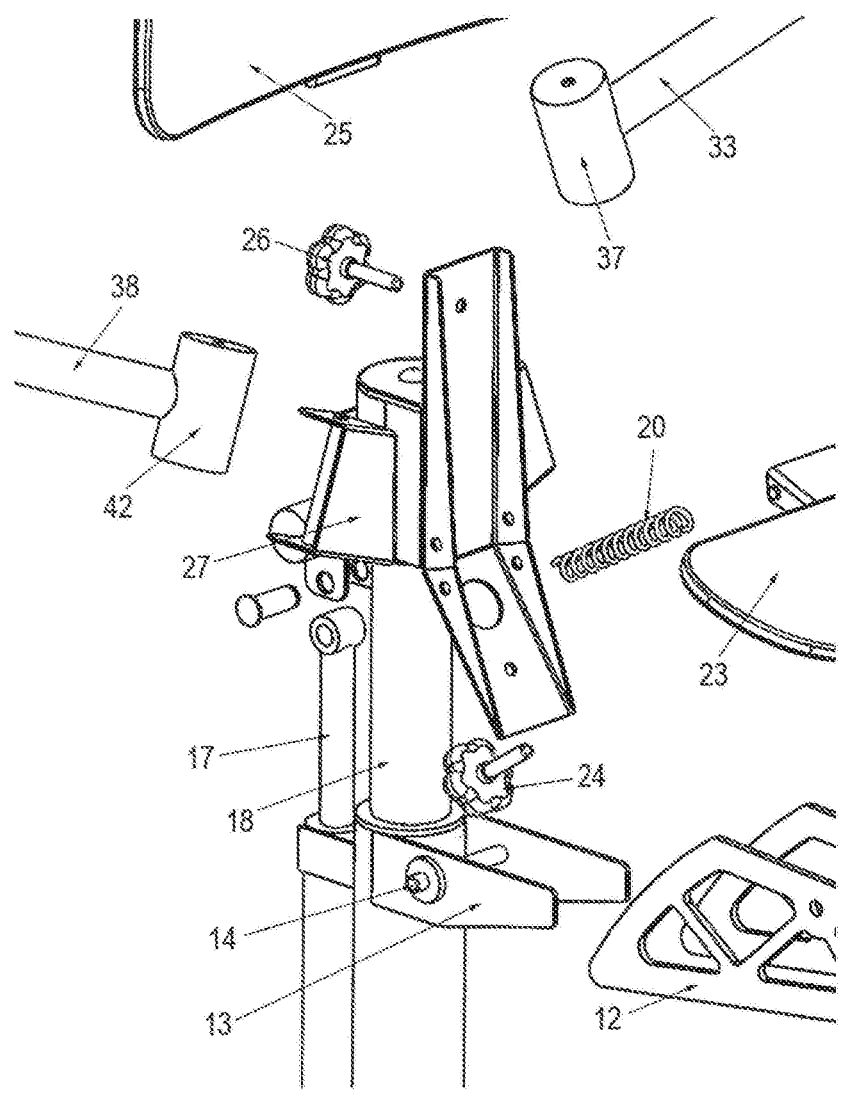
FIG. 24B is an exploded perspective front view illustrating an sitting mechanism on Joystick chair in accordance with one embodiment of the present invention.

Joystick chair represents input device for the computer or gaming console. It enables simpler, more comfortable and efficient playing of computer games, especially when it comes to Virtual reality. Joystick chair, with head mounted display, is a part of Virtual Reality SYSTEM.

In larger picture we see the VR System that consists of computer or game console for processing content, head mounted display (HMD) for stimulating Visual cortex, headphones for Auditory cortex and Joystick chair as human-machine interface (HMI) for input and to stimulate Somatosensory cortex in order to generate signals in Motor cortex by sheer proximity. Joystick chair is developed as a component for new approach to Virtual Reality as media, because it gives us reference hardware for movement and compatibility with existing content and hardware.

So far the biggest problem that Virtual Reality has had is nausea associated with movement. Standard control scheme (gemepad and mouse keyboard combo) creates different levels of discomfort in 60%, and nausea in 20% of all users. Therefore, we were unable to use existing contents, such as widely popular FPS games, and developers had to devise alternative mod for movement (teleporting), which mostly throws people out of Immersion, and breaks the gameplay. Also an important factor is that setting up for a VR session can be cumbersome, which affects the user to use the device less and less.

In order to solve these problems, we have proposed novel solutions. Instead of trying to stimulate the central nervous system in order to achieve the control of the content, we have achieved simulation of the ordinary gamepad and simultaneously generated a sense of motion without having to Influence the Vestibular system (i.e. middle ear stays in an axis all the time). In this way we have achieved control and compatibility with all popular non-VR contents on market, while decreasing the nausea due to movements. Learning curve is measured in seconds. Setting up a session is as easy as sitting on a chair and putting a hat on your head. The user is not disturbed by cables or forced to move furniture around. New comfort allows for several hours of continuous usage. Our solution is Design-agnostic that can be reproduced to fit any interior. This solution is compatible with all existing VR controllers and has several modes of integration. A very important option is also the use out of Virtual Reality where HMI can be utilised.

Our proprietary Software gives us the capability of customization and also prevents certain motion rules that can cause nausea, and, is constantly assisting the user from the background. In this way, the gap between the existing content and the specificity of the virtual reality is bridged without the need for additional programming and adjusting the movement by the developer. The user can adjust/customize the movement parameters to the specific level for each content separately. All this has profound effect on increasing the resistance to nausea for majority of users over prolonged period of time.

The Device Consists of Following Segments:
  Baseframe with a platform
  Mechanism for lifting and lowering the seat
  Sitting mechanism with backrest
  Controls
  Microcontroller Baseframe with a platform gives the Joystick chair strength and stability. On the front side of the base frame (1) platform joint (4) is attached, which can rotate the platform (3) between two positions. On the rear side of the base frame (1) the base frame support joint (6) is attached, which can rotate base frame support (7). This double folding feature comes in handy for the transport of Joystick chair because it significantly reduces its footprint, base frame support (7) with base frame support locking bolt (8) gives Joystick chair ability to be stable on significantly uneven surfaces. Adjustable feet (2) are for fine tuning of stability. Also on the front of the base frame (1) a linear actuator for angle regulation of the platform (16) is attached that regulates the angle of platform (3) over front rotary bracket (15).

Mechanism for lifting and lowering the seat enables the user to use the Joystick chair in two positions, leaning or sitting. The change from sitting to a leaning position is achieved by giving the command using the position controller (57) to the microcontroller (30) which issues a command to the linear actuator for secondary slider with pusher cylinder (18) that raises the secondary slider (18) having a push cylinder. By moving it up relieves back part of rotary support for forward portion of the seat (12) with forward portion of the seat (11), which is placed in a near vertical position. Also, by moving up, the secondary slider with pusher cylinder (18) lifts away the seat (23) from the seat support (13). Seat spring (20) is located between chair rotary head (27) and the seat (23), and pus it towards the seat adjustment bolt (24). That determines the angle of the seat (23).

Sitting mechanism with backrest lays on chair rotary head (27) that carries the seat (23) and the backrest (25), that carries the headrest (31). Angle of the Seat (23) can be adjusted by seat adjustment bolt (24). Angle of the backrest (25) can be adjusted by backrest adjustment bolt (26). The height of the seat (23) and the backrest (25) in the sitting position is adjusted by activating linear actuator for chair height regulation (10) which is inside central column (19) which can also rotate in rotation bearing of the central column (9). The height of the chair rotary head (27) can be adjusted by changing the height of the secondary slider with pusher cylinder (18), which blocks the rotary support for the forward portion of the seat (12) from the movement in the sitting position and allows its lowering in the leaning position. The rotary support for the forward portion of the seat (12) carries the forward portion of the seat (11) and is attached to the rotary axle of the rotary support for the forward portion of the seat (14) which is connected to the seat support (13) which is attached to the primary slider (5) and gives support to the seat (23) in the seated position.

Controls consist of five parts:
  Handles
  Control of forward and backward movement
  Controls for left or right turning
  Buttons
  Strife controls Handles consists of the left armrest joint (37), the right armrest joint (42), left armrest support (33), right armrest support (38), left armrest (34), right armrest (39), left controller (36) and right controller (41). The left armrest joint (37) and right armrest joint (42) allow the left armrest support (33) with left controller (36), and right armrest support (38) with the right controller (41) to be independently positioned in forward or back position. The use of left controller (36) and/or right controller (41) is independent of each other. When the left controller (36) and/or right controller (41) are in the back position, they are complete removed from the control process. This option allows unhindered use of other input devices, such as various handheld controllers with position recognition.

Control of forward and backward movement is achieved by pulling the left or right controllers (36 or 41) with fingers toward, or pushing away with palms. The force Is transferred over elastic left and right set of rubber rings (44 or 51) and measured by the left or right sensor (45 or 52). The force is measured by the left and right sensors (45 and 52) from where the signals are sent to the microcontroller (30), which processes the information and sends new commands for forward-backward movement to the computer via USB.

When we press our fingers against front of left or right controller (36 or 41) sensation received in Tactile corpuscles, some of impulsis from Bulbous corpuscles in our fingertips, and resulting logic calculation are transmitted through afferent nerve fiber of the Somatosensory system moving forward to the spinal cord. From there signals are transmitted via the Posterior column-medial lemniscus pathway (PCML) (also known as the Dorsal column-medial lemniscus pathway (DCML)) to the Postcentral gyrus (Somafosensory cortex) of the Primary somatosensory cortex, which is just next to (posterior to) the Primary motor cortex. There, noise is generated because of overlapping regions in cortex, as result of their proximity to each other. We are using sight to discard that noise, so when VR tricks the Visual cortex, by giving it visual representation of movement, noise becomes a slight sensation of forward movement for the user.

Controls for left or right turning is achieved by turning of the seat (23) that is connected to the chair rotary head (27), which transfers rotation to rotation sensor (28). Rotation sensor (28) is placed between the movable chair rotary head (27) and the immovable secondary slider with pusher cylinder (18). The signal generated in rotation sensor (28) is then sent to microcontroller (30) which processes the information and sends new commands for left-right turning to computer via USB.

The buttons are located on the inner sides of left and right controllers (36 and 41) available for thumbs of left and right hand.

The commands available to the left thumb are the button switchers as follows:
  LEFT PRIMARY TRIGGER (58)
  LEFT SECONDARY TRIGGER (59)
  LEFT TERTIARY TRIGGER (60)
  D-PAD UP BUTTON (68)
  D-PAD DOWN BUTTON (69)
  D-PAD LEFT BUTTON (67)
  D-PAD RIGHT BUTTON (70)
  START BUTTON (65), menu or start The commands available to the right thumb are the button switchers as follows:
  RIGHT PRIMARY TRIGGER (73)
  RIGHT SECONDARY TRIGGER (72)
  RIGHT TERTIARY TRIGGER (71)
  Button 1 (61)
  Button 2 (62)
  Button 3 (63)
  Button 4 (64)
  BACK BUTTON (66), exit to the menu.

Strife controls which consist of left strife control (49) and right strife control (56), are used for lateral left and right movement. They are not connected to the left controller (36) and right controller (41), which prevents diagonal movement.

Microcontroller (30) has two general functions:

1. Defining and changing the position of the Joystick chair by giving the commands to linear actuator for chair height regulation (10), linear actuator for angle regulation of the platform (16) and linear actuator for secondary slider with pusher cilindar (17). Also, it can memorise and recall previous Joystick chair position. Commands for this function are issued via position controller (57).

The commands for position controller (57) are:
  Pushing button (74) gives a command for changing from sitting to standing position of the Joystick chair.
  Pushing button (75) gives a command for changing from standing to sitting position of the Joystick chair.
  Pushing button (76) gives a command for raising of the seat (23) in both sitting and standing positions.
  Pushing button (79) gives a command for lowering of the seat (23) in both sitting and standing positions.
  Pushing button (77) gives a command for decreasing the angle of the platform (3).
  Pushing button (76) gives a command for increasing the angle of the platform (3).
  Pushing button (80) gives command for storing the current position of the Joystick chair by simultaneously pushing with one of the buttons for position 1 (81) or position 2 (82) or position 3 (83).
  Pushing button (81) gives command to the Joystick chair to go to position 1, and after pushing button (80) stores the position 1.
  Pushing button (82) gives command to the Joystick chair to go to position 2, and after pushing button (80) stores the position 2.
  Pushing button (83) gives command to the Joystick chair to go to position 3, and after pushing button (80) stores the position 3.

2. Second function of the microcontroller (30) is to give the standard gamepad commands to a PC or a console over USB port. All modifications of the moving commands are done with microcontroller (30) that gets the voltage from the left (45) and right controller sensors (52) for forward-backward movement, rotation sensor (28) for left-right turning and left (49) and right strife control (58) for moving sideways. This eliminates the need to modify the software to which the commands are issued, because it is received in a standard gamepad format or standart mouse and keyboard input. This functionality can be modified using proprietary software.

INDUSTRIAL AND OTHER APPLICATION OF INVENTION

The way of application of the invention includes all those applications for which the standard gamepad controller is applied, because output signals with which the commands are issued are identical. With already stated applications in a field of control, the invention enables comfortable usage in other applications also, in which the standing or sitting in one place is necessary.

Also, any other constructional improvements or changes that would be within the shown set, and in a goal of its functional improvement, are considered to be included with this registration.

What is claimed is:

1. A joystick chair comprising:
  a chair component having a base frame, a central column connected to said base frame, a rotary head, and a seat, a backrest and a headrest, each connected to the rotary head, and a headrest connected to the backrest; and
  a movement component wherein the rotary head is connected to the central column and a primary slider supporting a secondary slider with a push cylinder; and wherein the rotary head is centered to a middle position by a rotation sensor.

2. The joystick chair according to claim 1 wherein the rotary head is centered to the middle position from a left or right rotation by the rotation sensor, wherein the rotation sensor is attached on top of the secondary slider with a pusher cylinder.

3. The joystick chair according to claim 2 wherein the rotation sensor is attached to the primary slider.

4. The joystick chair according to claim 1 further comprising a microcontroller in communication with the rotation sensor attached to the secondary slider.

5. A method for controlling a joystick chair of claim 4 and further comprising sending commands for left-right turning to a computer via a USB with the microcontroller.

6. The method of claim 5, wherein transmitting forward-backward movement is from a left and a right controller and, a left and a right controller sensor sending signals to the microcontroller.

* * * * *